US012765717B2

(12) United States Patent
Murata et al.

(10) Patent No.: US 12,765,717 B2
(45) Date of Patent: Oct. 20, 2026

(54) FOOD STIRRING DEVICE, FOOD STIRRING METHOD AND FOOD MANUFACTURING METHOD

(71) Applicant: NICHIREI FOODS INC., Tokyo (JP)

(72) Inventors: Hiroaki Murata, Tokyo (JP); Tsukasa Shida, Tokyo (JP); Teiko Kobayashi, Tokyo (JP); Minoru Mamiya, Tokyo (JP); Jiro Kitamura, Tokyo (JP)

(73) Assignee: NICHIREI FOODS INC., Tokyo (JP)

(*) Notice: Subject to any disclaimer, the term of this patent is extended or adjusted under 35 U.S.C. 154(b) by 841 days.

(21) Appl. No.: 18/031,491

(22) PCT Filed: Oct. 12, 2021

(86) PCT No.: PCT/JP2021/037728
§ 371 (c)(1),
(2) Date: Apr. 12, 2023

(87) PCT Pub. No.: WO2022/080365
PCT Pub. Date: Apr. 21, 2022

(65) Prior Publication Data

US 2023/0371742 A1 Nov. 23, 2023

(30) Foreign Application Priority Data

Oct. 13, 2020 (JP) ................................ 2020-172643

(51) Int. Cl.
*A47J 37/04* (2006.01)
*B01F 29/60* (2022.01)
*B01F 101/06* (2022.01)

(52) U.S. Cl.
CPC ............ *A47J 37/047* (2013.01); *B01F 29/60* (2022.01); *B01F 2101/06* (2022.01)

(58) Field of Classification Search
CPC ...... A47J 37/047; A47J 43/1018; A47J 27/14; A47J 37/1214; A47J 37/1209;
(Continued)

(56) References Cited

U.S. PATENT DOCUMENTS

| | | | | |
|---|---|---|---|---|
| 2009/0092751 A1* | 4/2009 | Jiang | B29C 66/83221 427/164 |
| 2010/0269710 A1* | 10/2010 | Kobayashi | A47J 37/1228 99/348 |

(Continued)

FOREIGN PATENT DOCUMENTS

| | | |
|---|---|---|
| JP | 2004-24703 A | 1/2004 |
| JP | 2013-43068 A | 3/2013 |

(Continued)

OTHER PUBLICATIONS

English translation of International Preliminary Report on Patentability and Written Opinion of the International Searching Authority for International Application No. PCT/JP2021/037728, dated Apr. 27, 2023.

(Continued)

*Primary Examiner* — Phuong T Nguyen
(74) *Attorney, Agent, or Firm* — Birch. Stewart, Kolasch & Birch, LLP

(57) ABSTRACT

A technique for reducing stagnation of food at a specific location on a drum when food is stirred using the drum is disclosed. The disclosed food stirring device includes: a drum that extends in an axial direction, has a hollow shape, and includes: an inlet part through which a food to be fed to an inside of the drum passes; and an outlet part that is provided at a position different from the inlet part and through which the food to be discharged from the inside of the drum passes; a drum drive device that rotates the drum around a rotation axis; a stirrer that is at least partially located inside the drum; and a support member that is
(Continued)

attached to the drum and supports the stirrer, wherein there is a gap between an inner wall surface of the drum and the stirrer, and wherein a ratio of a shortest diameter to a longest diameter of a cross sectional surface, in a direction perpendicular to the axial direction, of a part of the stirrer that is located inside the drum is 1/3 or greater and 1 or less.

11 Claims, 4 Drawing Sheets

(58) Field of Classification Search
CPC ........ A47J 36/165; A47J 27/004; A47J 43/07; A47J 37/041; A47J 37/106; A23N 12/10; A23N 12/125; B01F 29/60; B01F 2101/06
USPC ........................... 99/348, 345, 409, 407, 427
See application file for complete search history.

(56) References Cited

U.S. PATENT DOCUMENTS

| | | | | |
|---|---|---|---|---|
| 2010/0330242 A1* | 12/2010 | Hori | .......................... | A23L 5/12 426/523 |
| 2017/0172197 A1* | 6/2017 | Han | ...................... | A23N 12/10 |

FOREIGN PATENT DOCUMENTS

| | | |
|---|---|---|
| JP | 2015-16305 A | 1/2015 |
| JP | 2016-112315 A | 6/2016 |

OTHER PUBLICATIONS

International Search Report, issued in PCT/JP2021/037728, PCT/ISA/210, dated Nov. 16, 2021.
Written Opinion of the International Searching Authority, issued in PCT/JP2021/037728, PCT/ISA/237, dated Nov. 16, 2021.

* cited by examiner

FOOD STIRRING DEVICE, FOOD STIRRING METHOD AND FOOD MANUFACTURING METHOD

TECHNICAL FIELD

The present disclosure relates to a food stirring device, a food stirring method and a food manufacturing method.

BACKGROUND ART

Apparatuses for stirring a food using a rotary drum are known (see, for example, Patent Literature 1).

CITATION LIST

Patent Literature

Patent Literature 1: Japanese patent application publication No. 2004-24703

SUMMARY OF THE INVENTION

Technical Problem

When a food is stirred with the use of a drum, by preventing a part of the food from staying at a specific location on the drum, it is possible to properly stir the entire food fed into the drum and it is also advantageous from a sanitary standpoint.

The present disclosure has an object of providing a technique for reducing stagnation of a food at a specific location on a drum when the food is stirred using the drum.

Solution to Problem

One aspect of the present disclosure is directed to a food stirring device comprising: a drum that extends in an axial direction, has a hollow shape, and includes: an inlet part through which a food to be fed to an inside of the drum passes; and an outlet part that is provided at a position different from the inlet part and through which the food to be discharged from the inside of the drum passes; a drum drive device that rotates the drum around a rotation axis; a stirrer that is at least partially located inside the drum; and a support member that is attached to the drum and supports the stirrer, wherein there is a gap between an inner wall surface of the drum and the stirrer, and wherein a ratio of a shortest diameter to a longest diameter of a cross sectional surface, in a direction perpendicular to the axial direction, of a part of the stirrer that is located inside the drum is ⅓ or greater and 1 or less.

Another aspect of the present disclosure is directed to a food stirring method comprising the steps of: feeding a food to an inside of a drum that extends in an axial direction and has a hollow shape, via an inlet part of the drum; rotating the drum; and discharging the food inside the drum from the drum, via an outlet part of the drum that is provided at a position different from the inlet part, wherein a stirrer that is supported by a support member attached to the drum is at least partially located inside the drum, wherein as the drum is rotated, the food inside the drum passes through a gap between an inner wall surface of the drum and the stirrer, and wherein a ratio of a shortest diameter to a longest diameter of a cross sectional surface, in a direction perpendicular to the axial direction, of a part of the stirrer that is located inside the drum is ⅓ or greater and 1 or less.

Another aspect of the present disclosure is directed to a food manufacturing method comprising the steps of: feeding a food to an inside of a drum that extends in an axial direction and has a hollow shape, via an inlet part of the drum; rotating the drum; and discharging the food inside the drum from the drum, via an outlet part of the drum that is provided at a position different from the inlet part, wherein a stirrer that is supported by a support member attached to the drum is at least partially located inside the drum, wherein as the drum is rotated, the food inside the drum passes through a gap between an inner wall surface of the drum and the stirrer, and wherein a ratio of a shortest diameter to a longest diameter of a cross sectional surface, in a direction perpendicular to the axial direction, of a part of the stirrer that is located inside the drum is ⅓ or greater and 1 or less.

Advantageous Effects of Invention

According to the present disclosure, when a food is stirred using a drum, stagnation of the food at a specific location on the drum can be reduced.

DETAILED DESCRIPTION

One embodiment of the present disclosure is described below with reference to the drawings.

In the following description, unless otherwise indicated, the terms of "upstream" and "downstream" are based on a direction in which a food is conveyed. Further, the terms of "above" and "below" are based on a direction of height (i.e., a direction along the vertical direction in which gravity acts), and a horizontal direction is a direction forming a right angle with respect to the direction of height.

A "food" includes one or more types of food ingredients. The state of each food ingredient is not limited and may be a solid state, a liquid state, or other states (including a mixture state of a liquid and a solid). Further, the constituents of each food ingredient are not limited, and a food may include one or more of milk, dairy products, eggs, seafood, meat, beans, vegetables, fruits, grains such as rice, seasonings and other food ingredients.

Figure 1:
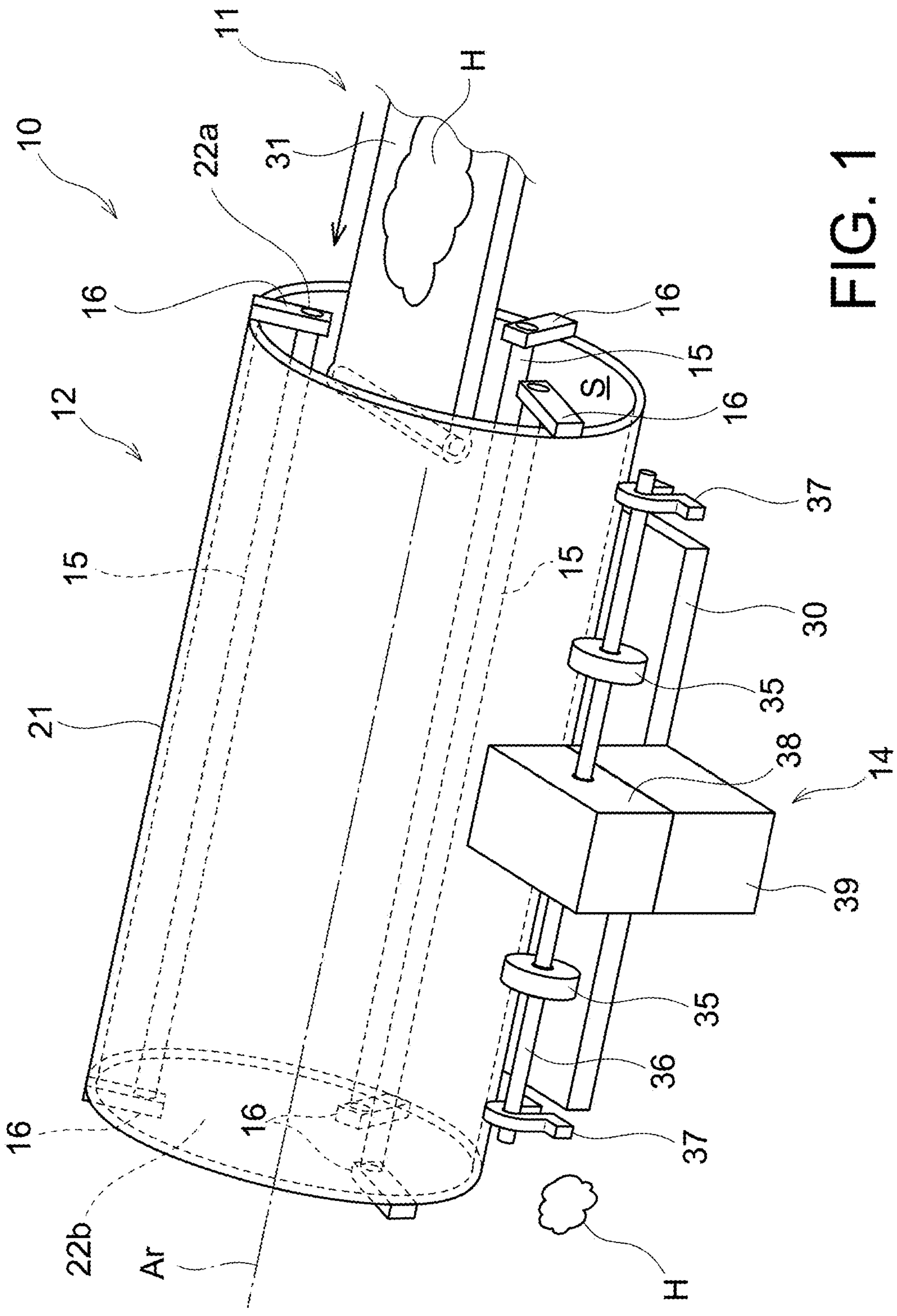
FIG. 1 is an oblique perspective view showing a schematic configuration of one example of a food manufacturing apparatus.
Figure 2:
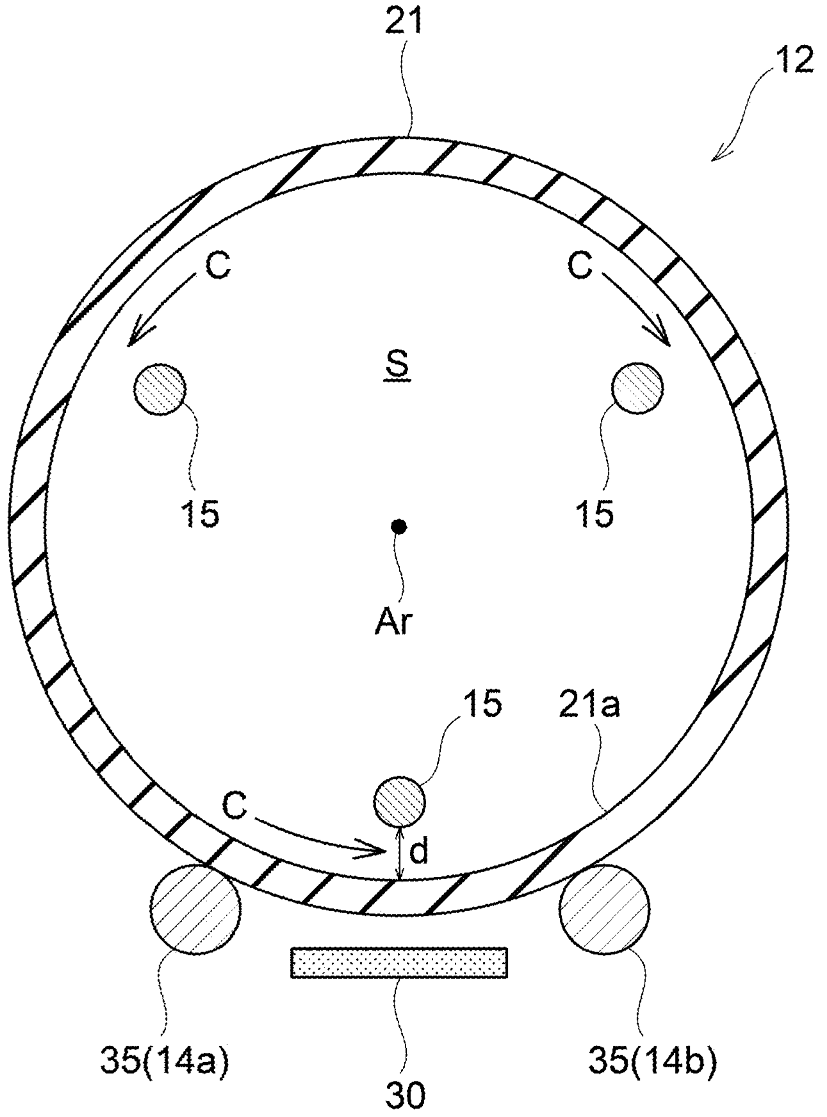
FIG. 2 is a cross sectional view of an example of arrangement of a drum, stirrers, drive rollers and a heat rising device.

FIG. 1 is an oblique perspective view showing a schematic configuration of one example of a food manufacturing apparatus 10. FIG. 2 is a cross sectional view of an example of arrangement of a drum 21, stirrers 15, drive rollers 35 and a heat rising device 30.

The food manufacturing apparatus 10 comprises: a feeding device 11 that conveys a food H; and a food stirring device 12 that stirs a food H (e.g., a food H containing viscous food ingredients) supplied from the feeding device 11.

The feeding device 11 includes a conveyance device 31 that conveys a food H downstream. The specific configuration of the feeding device 11 is not limited and the feeding device 11 can take any configuration suitable for conveying the food H. For example, net conveyors including a netted conveyor member that moves along with the food H placed thereon, guides (including, for example, a hose-like guide and a pipe-like guide) that guide the food H, or other devices can be applied to the feeding device 11. The conveyance device 31 shown in diagrams is configured as a belt conveyor that includes an endless conveyor belt. The food H is carried downstream in a state of being placed on the conveyor belt, and is fed to the food stirring device 12 (in particular, to the inside of the drum 21) when the conveyor belt reverses at the most downstream position. Although the most downstream position of the conveyor belt is not limited, by positioning the most downstream position of the conveyor belt in the inner space of the drum 21 (i.e., in the "hollow space S"), it is possible to effectively prevent the food H flying off the conveyor belt from scattering outside the drum 21.

The food stirring device 12 includes a hollow drum 21, a drum drive device 14, stirrers 15 and support members 16.

The drum 21 extends in the direction (i.e., the "axial direction") in which the rotation axis Ar extends, has circular cross-sectional openings at both ends (i.e., "end openings 22*a*, 22*b*"), and is provided to be able to rotate around the rotation axis Ar. The food H that is carried from upstream by the conveyance device 31 (in the present instance, a conveyor belt), is fed to the inside of the drum 21 through one end opening 22*a*.

The rotation axis Ar extends along a non-horizontal direction, and the axial direction of the drum 21 is inclined with respect to a horizontal direction. Specifically, the rotation axis Ar is inclined in such a manner that one end opening 22*a* on the feeding device 11 side is positioned slightly higher than the other end opening 22*b*. This causes the food H in the drum 21 to gradually move toward the other end opening 22*b* under the influence of gravity.

The drum drive device 14 rotates the drum 21 around the rotation axis Ar. The drum drive device 14 of the present embodiment includes a first drive unit 14*a* and a second drive unit 14*b* that support the drum 21 rotatably from below, as shown in FIG. 2. The first drive unit 14*a* and the second drive unit 14*b* have the same configuration, each including drive rollers 35, a drive shaft 36, drive bearings 37, a power transmission mechanism 38 and a drive source 39. Power output from the drive source 39 such as a motor is transmitted to the drive shaft 36 via the power transmission mechanism 38. Both ends of the drive shaft 36 are rotatably supported by the drive bearings 37, and the drive shaft 36 rotates about its axis in response to the power transmitted from the power transmission mechanism 38. The rotation center axis of the drive shaft 36 extends along a non-horizontal direction, and the axial direction of the drive shaft 36 (i.e., the direction in which the rotation center axis extends) is inclined with respect to a horizontal direction to the same degree as the rotation axis Ar of the drum 21. One or more drive rollers 35 attached to a middle part of the drive shaft 36 between the drive bearings 37 (in the instance shown in diagrams, two drive rollers 35 fixed to portions between the power transmission mechanism 38 and the respective drive bearings 37) rotate along with the drive shaft 36.

The specific configuration of the drum drive device 14 is not limited to the above instance. The drum drive device 14 may include a plurality of drive sources 39 (in the above instance, two drive sources 39) or may include a single drive source 39. For example, a single drive source 39 may be shared by the first drive unit 14*a* and the second drive unit 14*b* described above. Power output from a single drive source 39 may be transmitted to both the power transmission system of the first drive unit 14*a* and the power transmission system of the second drive unit 14*b*. For example, the power transmission system of the first drive unit 14*a* and the power transmission system of the second drive unit 14*b* may be connected by any power transmission device (for example, a gear and/or a chain). In this case, the power transmitted from the single drive source 39 to one power transmission system can be transmitted to the other via the power transmission device. Further, the specific configuration of the power transmission system of the drum drive device 14 is not limited to the above instance (i.e., the "combination of the power transmission mechanism 38, the drive shaft 36 and the drive rollers 35"). For example, the power transmission system of the drum drive device 14 may include: a sprocket-shape gear that is fixedly installed on the outer circumference of the drum 21; and an endless chain having a roller chain shape that is engaged with the gear. In this case, the power output from the drive source 39 causes the endless chain to run in such a manner that the drum 21 can be rotated along with the gear.

The drum 21 is placed on the drive rollers 35 of the first drive unit 14*a* and the second drive unit 14*b,* and rotates while rolling on the drive rollers 35 in accordance with the rotation of the drive rollers 35. The drive rollers 35 (the four drive rollers 35 in the instance shown in diagrams) of the respective first drive unit 14*a* and second drive unit 14*b* rotate in the same rotational direction at the same rotational speed.

The stirrers 15 are at least partially located inside the drum 21 in a state of being supported by the support members 16 attached to the drum 21, and promote stirring of the food H inside the drum 21 in accordance with the rotation of the drum 21. In the present embodiment, a plurality of stirrers 15 (in the instance shown in diagrams, three stirrers 15) are provided at equal angular intervals around the rotation axis Ar. Each stirrer 15 penetrates the hollow space S of the drum 21 along the inner wall surface 21*a* at a position close to the inner wall surface 21*a* of the drum 21. Both ends of each stirrer 15 are fixed to the drum 21 (to both ends of the drum 21 in the instance shown in diagrams) via support members 16, at the outer side of the drum 21 (i.e., at the outer side of both end openings 22*a* and 22*b*). Thus, each stirrer 15 moves along with the inner wall surface 21*a* of the drum 21 around the rotation axis Ar in accordance with the rotation of the drum 21.

Each stirrer 15 and each support member 16 in the present embodiment are not in contact with the inner wall surface 21*a* of the drum 21. In the instance shown in diagrams, any object other than the food H fed by the feeding device 11 does not make contact with the inner wall surface 21*a* of the drum 21, and the inner wall surface 21*a* is a smooth curved surface with a constant curvature. A gap C (see FIG. 2) is provided between the inner wall surface 21*a* of the drum 21 and each stirrer 15.

As described above, the stirrers 15 and the support members 16 are not in contact with a part of the inner wall surface 21*a* of the drum 21 that is positioned on the outlet part side (i.e., on the end opening 22*b* side) of the part of the feeding device 11 where the food H is fed to the inside of the drum 21 in the direction (the axial direction) along the rotation axis Ar. Here, "a part of the inner wall surface 21*a* of the drum 21 that is positioned on the outlet part side (i.e., on the end opening 22*b* side) of the part of the feeding device 11 where the food H is fed to the inside of the drum 21 in the direction (the axial direction) along the rotation axis Ar" means, for example, a part of the inner wall surface 21*a* on the outlet part side from "the point where a line extending in the vertical direction from the part of the feeding device 11 that feeds the food H to the inside of the drum 21 intersects with the inner wall surface 21*a*".

Each gap C has a size that is large enough to allow at least one type of solid form food ingredient inside the drum 21 to pass through. The specific size of each gap C is not limited. As an example, the size of a gap C in the direction from one to the other of the inner wall surface 21*a* of the drum 21 and each stirrer 15 (see the reference sign of "d" in FIG. 2) is larger than the minimum size of each of the solid form food ingredients contained in the food H fed to the inside of the drum 21. For example, the size d of each gap C may be larger than the maximum size of each of the solid form food ingredients contained in the food H fed to the inside of the drum 21. The sized of a gap C between each stirrer 15 and the inner wall surface 21*a* may be the same or be different over the axial direction of the drum 21. In consideration of the normal size of general foods H that are often stirred using a drum 21, by adjusting the size d of a gap C to approximately 1 mm to 20 cm (i.e., approximately 1 mm or longer but 20 cm or shorter), the stagnation of the food H at a specific location on the drum 21 can be often effectively reduced. Further, in cases where the food H contains no or little large-sized food ingredients, by adjusting the size d of a gap C to approximately 1 mm to 15 cm (e.g., approximately 5 mm to 15 cm), the stagnation of the food H can be often effectively reduced. In cases where the food H of a medium size or smaller with relatively small size variation is stirred, by setting the size d of a gap C to approximately 1 cm to 15 cm (e.g., approximately 1 cm to 10 cm), the stagnation of the food H can be often effectively reduced. The size d of a gap C is the shortest distance between a stirrer 15 and the inner wall surface 21*a* of the drum 21.

Here, the "solid form food ingredients" refer to solid foodstuffs, but micro food ingredients generally recognized as "powder" are not included in the "solid form food ingredients". For example, solid foodstuffs having a cross-sectional diameter of 1 mm or greater are classified as "solid form food ingredients" while solid foodstuffs having a cross-sectional diameter only having less than 1 mm are not classified as "solid foodstuffs.

Figure 3:
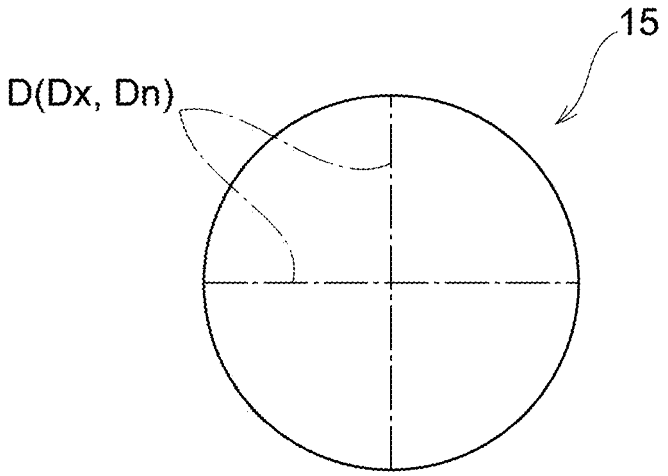
FIG. 3 is a diagram illustrating a cross sectional surface of a stirrer by an example.
Figure 4:
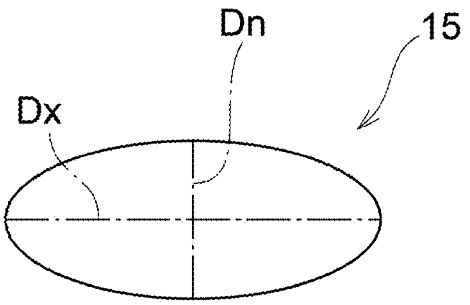
FIG. 4 is a diagram illustrating a cross sectional surface of a stirrer by an example.
Figure 5:
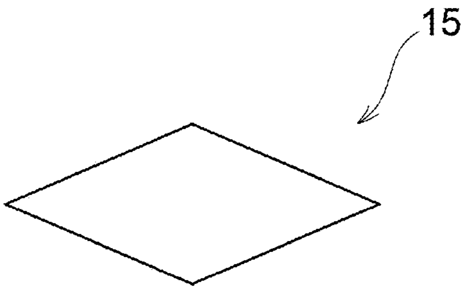
FIG. 5 is a diagram illustrating a cross sectional surface of a stirrer by an example.

FIGS. 3 to 5 are diagrams illustrating a cross sectional surface of stirrers 15 by an example.

The shape and the size of each stirrer 15 are not limited. Each stirrer 15 may have, for example, a circular cross section (see FIG. 3), an oval cross section (see FIG. 4), or a polygonal cross section (e.g., a triangular shape and a quadrilateral shape (e.g., a rectangular shape, a square shape, a parallelogram shape, a diamond shape, and a trapezoid shape)) (see FIG. 5). However, from the viewpoint of reducing the adhesion and stagnation of the food H on each stirrer 15, it is preferable that each stirrer 15 have a smooth surface and that the surface area of each stirrer 15 be smaller. Therefore, a stirrer 15 with a circular cross section (see FIG. 3) is preferable from the viewpoint of reducing the adhesion and stagnation of the food H.

As a result of the inventors' diligent research, the inventors of the present case have newly obtained the knowledge that a stirrer 15 that satisfies the following conditions is preferable from the viewpoint of reducing the adhesion and stagnation of the food H. Specifically, the ratio of the shortest diameter to the longest diameter of the cross sectional surface, in a direction perpendicular to the axial direction of the drum 21, of the part of each stirrer 15 that is located inside the drum 21 is preferably "⅓ or greater and 1 or less" and is more preferably "½ or greater and 1 or less". Here, the diameter of the cross sectional surface is the length of a line segment on the cross sectional surface that passes through the center (center of gravity) of the cross sectional surface and is sectioned by the boundary (edge) of the cross sectional surface.

Further, from the viewpoint of preventing the food H from sticking and stagnating, it is preferable that a stirrer 15 do not have a surface of a recessed shape. In particular, it is preferable that the cross sectional surface, in the direction that forms a right angle to the axial direction of the drum 21, of a part (in particular, the whole part) of a stirrer 15 that is located inside the drum 21 do not have a recessed part (e.g., a recessed edge). The food H tends to adhere to and stagnate on a recessed part when the food H is stirred. From the viewpoint of preventing adherence and stagnation of the food H, it is preferable that the cross sectional surface, in the direction that forms a right angle to the axial direction of the drum 21, of a part (in particular, the whole part) of a stirrer 15 that is located inside the drum 21 have no recesses and protrusions (e.g., at the edge) or few recesses and protrusions. The differential coefficient of the outer circumferential line (in other words, of a line representing the surface of a stirrer 15) of the cross sectional surface, in a direction perpendicular to the axial direction of the drum 21, of a part (in particular, the whole part) of a stirrer 15 that is located inside the drum 21 may be constant or may vary continuously. If the differential coefficient of the outer circumferential line of the cross sectional surface, in a direction perpendicular to the axial direction of the drum 21, of a part (in particular, the whole part) of a stirrer 15 that is located inside the drum 21 is not constant, it is preferable that the cross sectional surface have a protrusion part (for example, a protrusion edge).

The edge referred to here is a part of the outer circumferential line of the cross sectional surface of a stirrer 15 that does not form a smooth curve, and for example, a part of the outer circumferential line of the cross sectional surface of a stirrer 15 that is unable to be differentiated may constitute an edge. A protrusion edge of the cross sectional surface of a stirrer 15 has an edge angle less than 180 degrees, while a recessed edge has an edge angle greater than 180 degrees.

From the viewpoint of preventing adherence and stagnation of the food H, it is preferable that a stirrer 15 do not have a complicated surface shape (in particular, a recessed shape), and a stirrer 15 with numerous irregularities, such as a comb shape, is not necessarily preferable. Further, since a gap where the food H easily adheres is easily formed at a joint part between members, it is preferable that a stirrer 15 be configured by a single member with no gaps. Further, the cross sectional surface, in a direction perpendicular to the axial direction of the drum 21, of a part (in particular, the whole part) of a stirrer 15 that is located inside the drum 21 may have a symmetrical shape and may have a rotational symmetry (including a point symmetry and a line symmetry).

For example, in a case of a stirrer 15 with a circular cross sectional surface (see FIG. 3), the ratio of the shortest diameter Dn to the longest diameter Dx is 1 (i.e., "(shortest diameter Dn/longest diameter Dx)=1") because the diameter D of the cross sectional surface of the stirrer 15 in a direction forming a right angle with the axial direction of drum 21 is constant. In a case of a stirrer 15 with an elliptical cross section (see FIG. 4), the length of the short axis of the cross sectional surface (i.e., the short diameter) is the shortest diameter Dn, the length of the long axis of the cross sectional surface (i.e., the long diameter) is the longest diameter Dx, and it is preferable that "⅓≤(short diameter/long diameter) <1" be satisfied. Further, when one diagonal of the cross sectional surface is the shortest diameter Dn and the other diagonal is the longest diameter Dx, it is preferable that "⅓≤(one diagonal/other diagonal)≤1" be satisfied.

According to the stirrers 15 described above, when the food H is stirred, the food H can be effectively stirred while the food H is prevented from adhering to the stirrers 15. In particular, the stirrers 15 described above move to cut into the food H during stirring, so that the food H is stirred by the stirrers 15 in a state where there is an escape place. As a result, it is possible to mix the food H while suppressing excessive pressure from the stirrers 15 to the food H. Thus, according to the stirrers 15 described above, the entire food H can be effectively stirred while the crushing and damage of the food H during stirring are suppressed to effectively prevent the reduction of the flavor and the texture of the food H.

The food H after being stirred is discharged from the drum 21 through the end opening 22*b*.

As described above, in the food manufacturing apparatus 10 shown in FIG. 1, one end opening 22*a* on the feeding device 11 side acts as "the inlet part through which the food H to be fed to the inside of the drum 21 passes", and the other end opening 22*b* acts as "the outlet part through which the food H to be discharged from the inside of the drum 21 passes. However, the inlet part and the outlet part referred to here are not limited to both end openings 22*a*, 22*b* of the drum 21, but can be formed at any mutually different locations of the drum 21, and for example, may be formed in the middle of the body of the drum 21.

The food stirring device 12 of the present embodiment further comprises a heat rising device 30 that raises the temperature of the food H inside the drum 21, and raises the temperature of the food H inside the drum 21 while stirring the food H. Thus, the food stirring device 12 of the present embodiment can also be used as a heat cooking device that performs stirring and heat cooking of the food H in a simultaneous manner.

The specific configuration and temperature raising method of the heat rising device 30 are not limited. Typically, the heat rising device 30 can raise the temperature of the food H via the drum 21. For example, in a case where the heat rising device 30 is equipped with a heat generating device such as a gas combustion device and the heat emitted by the heat generating device is transferred to the drum 21 to heat the drum 21, the food H inside the drum 21 can be heated by the drum 21. Further, in a case where the heat rising device 30 is equipped with an induction heating device (an IH device) and the drum 21 including metal is caused to generate heat itself by the magnetic field generated by the induction heating device based on the electromagnetic induction principle, the food H inside the drum 21 can be heated by the drum 21. Further, the heat rising device 30 may raise the temperature of the food H inside the drum 21 in a direct manner, not via the drum 21. For example, the heat rising device 30 may apply energy (e.g., microwaves (radio waves)) to the food H inside the drum 21 in a direct manner in such a manner that the temperature of the food H is raised.

A food manufacturing method using the food manufacturing apparatus 10 described above (including a food stirring method using the food stirring device 12) includes, for example, the following steps.

A food manufacturing method (including a food stirring method) includes: a step of feeding the food H to the inside of the drum 21 from the conveyance device 31; a step of rotating the drum 21; and a step of moving the food H inside the drum 21 toward the end opening 22*b* of the drum 21 to discharge the food H from the end opening 22*b*. The food H that has been sent via the conveyance device 31 and has been fed to the inside of the drum 21 via one end opening 22*a*, moves toward the other end opening 22*b* in accordance with the rotation of the drum 21 and is finally discharged from the drum 21 through the end opening 22*b*. The start timings of the respective steps are not limited. For example, the timing of the start of rotation of the drum 21 may be before, after, or at the same time as the timing when the food H is started to be fed into the drum 21.

By the drum 21 rotating, the food H passes through the gaps C between the inner wall surface 21*a* of the drum 21 and the respective stirrers 15 while being stirred by each stirrer 15. As a result, it can be effectively suppressed that the food H stagnates at specific locations on the drum 21 while the food H is being stirred using the drum 21.

As explained above, according to the food manufacturing apparatus 10 (including the food stirring device 12) and the food manufacturing method (including the food stirring method) of the present embodiment, it is possible to reduce the stagnation of the food H at specific locations on the drum 21 when the food H is stirred by using the drum 21.

In conventional apparatuses (e.g., the apparatus of Patent Literature 1) where no gap exists between the drum inner wall surface and a stirrer, a food tends to accumulate and stagnate in front of and behind the protruding portions including the stirrer, the stirring of the entire food inside the drum is inhibited, and stagnant food may cause hygiene issues. In particular, in cases where the food H contains viscous food ingredients having a high viscosity, stagnation of the food in the drum is likely to occur, inhibiting the stirring performance for the food in the drum and increasing hygiene concerns. Viscous food ingredients that tend to stagnate in the drum include, for example, cooked rice, foodstuffs, such as meat, seafood, and vegetables, with liquid (e.g., seasonings) attached to them, and the like. In addition, in cases where the food inside the drum is heated, stagnant food in the drum may get burned, resulting in a decrease in the quality of the entire food in the drum.

In contrast, according to the apparatus and the method of the present embodiment, the food H inside the drum 21 can pass through the gaps C, and thus stagnation of the food H between the inner wall surface 21*a* of the drum 21 and each stirrer 15 is unlikely to occur. In particular, even in cases where the food H contains viscous food ingredients, the gaps C make occurrence of the stagnation of the food H unlikely. Further, even if a part of the food H temporarily stagnates in a gap C, the "foodstuffs stagnating in a gap C" collide with other foodstuffs in accordance with the rotation of the drum 21, and thus the foodstuffs can be relatively easily released from the stagnation in the gap C. In this manner, according to the apparatus and the method of the present embodiment, stagnation of the food H in the drum 21 can be prevented, and it is possible to achieve quality assurance of the food H based on high-level stirring performance for the food H, hygiene maintenance and prevention of burning.

Further, by adjusting the ratio of the shortest diameter to the longest diameter of the cross sectional surface, in a direction forming a right angle to the axial direction, of a part of each stirrer 15 that is located inside the drum 21 to at least ⅓ but no more than 1, it is possible to effectively reduce the adhesion and stagnation of the food H on each stirrer 15.

Further, by each stirrer 15 and each support member 16 not being contact with the inner wall surface 21*a* of the drum 21, it is advantageous for each stirrer 15 and each support member 16 to not stagnate the food H in the drum 21 or to reduce the stagnation of the food H in the drum 21.

Further, in cases where each stirrer 15 is not divided in the direction along the rotation axis Ar and penetrates the inside of the drum 21 (i.e., the hollow space S), both end side parts of each stirrer 15 can be supported by support members 16 installed outside the drum 21. In cases where a stirrer 15 has a split configuration and the part of the stirrer 15 that extends inside the drum 21 is composed of two or more members, a support member 16 may be required to be installed inside the drum 21 to properly support the stirrer 15. Such a support member 16 installed inside the drum 21 can cause stagnation of the food H in the drum 21. In contrast, according to the present embodiment, it is possible to extend each stirrer 15 over the entire length in the axial direction of the drum 21 without having to install a support member 16 inside the drum 21.

Further, by making the size of a gap C larger than the minimum size of each solid form food ingredient, stagnation of the food H caused by each stirrer 15 can be suppressed during the rotation of the drum 21.

Further, by providing the heat rising device 30, stirring and temperature rising of the food H in the drum 21 can be carried out in a simultaneous manner.

Further, by tilting the axial direction of the drum 21 with respect to the horizontal direction, the movement of the food H in the drum 21 can be promoted using gravity.

Further, a series of steps including the feeding of the food H into the drum 21, the stirring of the food H in the drum 21, the moving of the food H in the drum 21 and discharging of the food H from the drum 21, can be performed in a continuous manner.

Further, even if the food H contains viscous food ingredients that are likely to stagnate inside the drum 21, stagnation of the food H between the inner wall surface 21*a* of the drum 21 and each stirrer 15 can be suppressed.

[Consideration Using Actual Equipment]

The inventors of the present case have actually built various food manufacturing apparatuses comprising a food stirring device and have had a look at the stagnation of food inside the drum.

Figure 6:
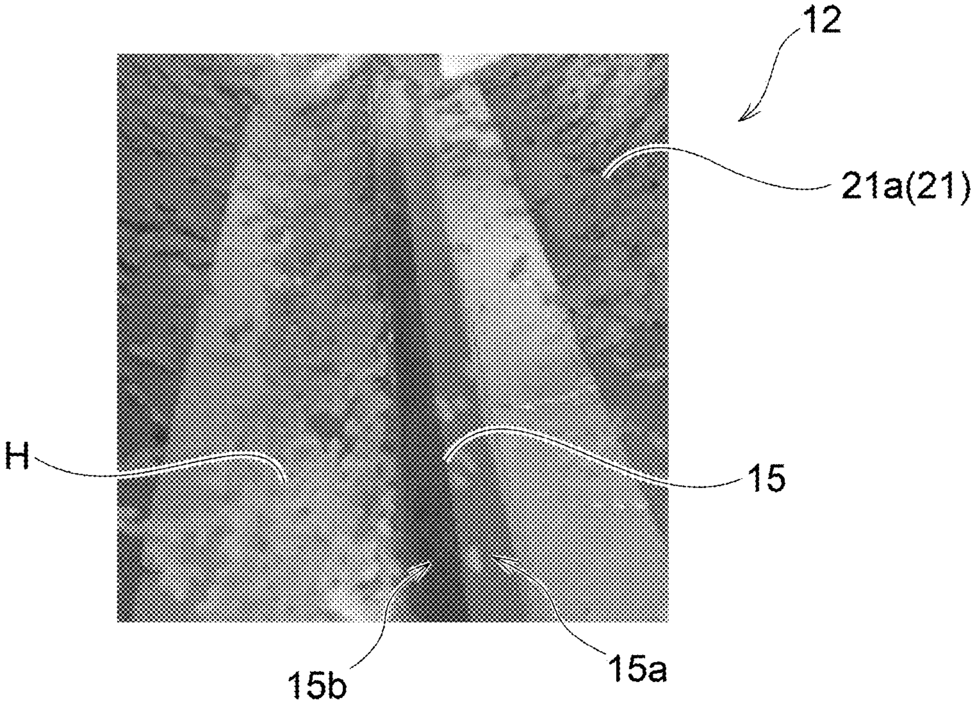
FIG. 6 is a photograph of an area around a stirrer taken immediately after a food was stirred using a food stirring device in which "a gap through which the food inside a drum can pass" is not provided between an inner wall surface of the drum and each stirrer.

FIG. 6 is a photograph of an area around a stirrer 15 taken immediately after the food H was stirred using the food stirring device 12 in which "a gap C through which the food H inside the drum 21 can pass" is not provided between an inner wall surface 21*a* of the drum 21 and each stirrer 15. In the food stirring device 12 shown in FIG. 6, a stirrer 15 having a triangular cross sectional surface was directly attached to the inner wall surface 21*a* of the drum 21.

Figure 7:
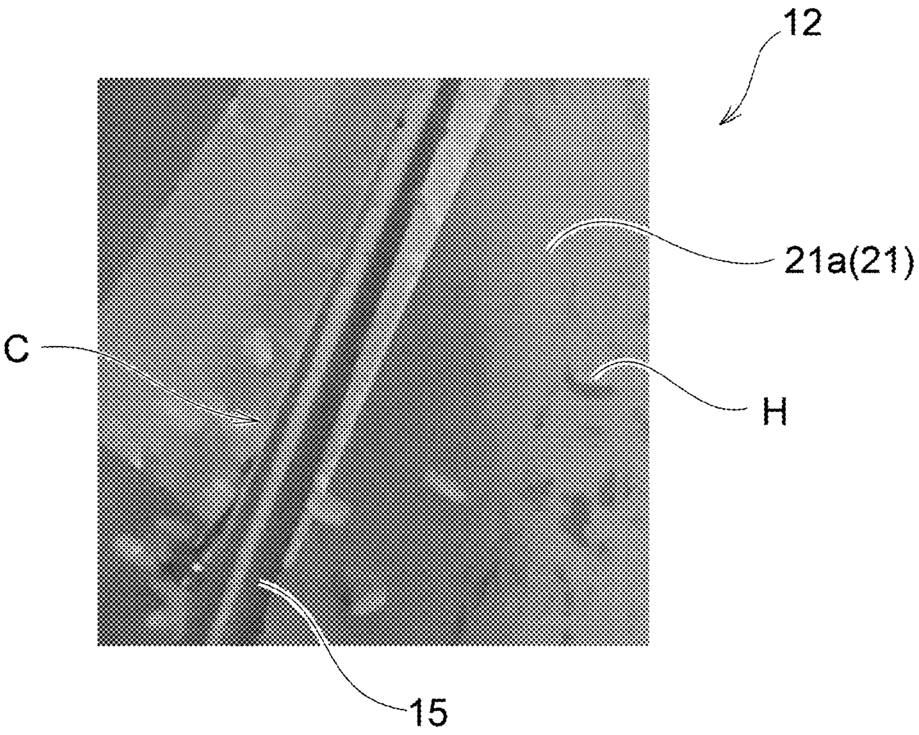
FIG. 7 is a photograph of an area around a stirrer taken immediately after a food was stirred using the food stirring device in which "a gap through which the food inside a drum can pass" is provided between an inner wall surface of the drum and each stirrer.

FIG. 7 is a photograph of an area around a stirrer 15 taken immediately after the food H was stirred using the food stirring device 12 in which "a gap C through which the food H inside the drum 21 can pass" is provided between the inner wall surface 21*a* of the drum 21 and each stirrer 15. In the food stirring device 12 shown in FIG. 7, a gap C existed between a stirrer 15 having a circular cross section and the inner wall surface 21*a* of the drum 21.

Between the food stirring devices 12 shown in FIGS. 6 and 7 respectively, the food H was stirred under basically the same conditions except for the difference in the configuration of the food stirring devices 12, and the type and the ratio of the food ingredients contained in the food H were also common, and the food H containing cooked rice being a viscous food ingredient was used.

It can be seen that, in a case where the food stirring device 12 does not have gaps C, as is clear from FIG. 6, a relatively large amount of food H adhered to and stagnated on the stirrer 15. While a small amount of food H adhered to the wall surface part located on the rotation direction side (i.e., to a "rotation progression side part 15*a*") of the stirrer 15 shown in FIG. 6, a large amount of food H adhered to the wall surface part located on the opposite side (i.e., to a "rotation back side part 15*b*") of the stirrer 15 shown in FIG. 6. This is due to the fact that during the rotation of the drum 21, the food H repeatedly contacts and collides with the rotation progression side part 15*a* while the frequency of contact and collision of the food H with respect to the rotation back side part 15*b* is not high. As described above, in cases where the food stirring device 12 does not have gaps C, the stirrers 15 (in particular, the rotation back side part 15*b*) have a strong tendency to keep the same food ingredients adhering to and stagnating on the stirrers 15 for a long period of time.

In contrast, in cases where the food stirring device 12 has a gap C, as is clear from FIG. 7, there was almost no food H adhering to the inner wall surface 21*a* of the drum 21.

As can be seen from the comparison of FIGS. 6 and 7 described above, the stagnation of the food H on the inner wall surface 21*a* of the drum 21 can be significantly reduced by the presence of a "gap C through which the food H inside the drum 21 can pass" between the inner wall surface 21*a* of the drum 21 and each stirrer 15.

[Variants]

The support members 16 may be attached to the inner wall surface 21*a* of the drum 21. For example, even in cases where the drum 21 having a large axial length is used, a stirrer 15 can be stably supported by fixing the stirrer 15 via a support member 16 onto the inner wall surface 21*a* of the drum 21.

The stirrers 15 and/or the support members 16 may be provided to be able to be attached to and be released from the drum 21. For example, a support member 16 may be removably attached to the drum 21 including metal using the magnetic force of a magnet that the support member 16 has. Further, in cases where one of a stirrer 15 and a support member 16 includes a magnet and the other includes a magnet or metal, the stirrer 15 can be removably attached to the support member 16 using magnetic force.

A stirrer 15 and a support member 16 may be provided in an integrated manner by the same member, and there may be no physical boundary between the stirrer 15 and support member 16. Further, a support member 16 and the drum 21 may be provided in an integrated manner by the same member, and there may be no physical boundary between the support member 16 and the drum 21. For example, a part of the inner wall surface 21*a* of the drum 21 may be raised toward the hollow space S side, and the raised part may be used as a support member 16.

Each device included in the food manufacturing apparatus 10 may be driven under the control of a control device (not shown in the drawings) or may be manually controlled by an operator. When each device is controlled by a control device, the control device may operate a plurality of devices in relation to each other. For example, the control device may control the feeding device 11 and the drum drive device 14 while liking the driving of the feeding device 11 (the conveyance device 31) and the driving of the drum drive device 14 (i.e., the rotation of the drum 21) to each other.

The present disclosure is not limited to the embodiments and the variants described above. Various modifications may be added to each of the elements of the embodiments and the variants described above. Further, the configurations of the embodiments and the variants described above may be combined in whole or in part.

[Additional Notes]

As is clear from the above, the present disclosure includes the following aspects.

(Aspect 1)

One aspect of the present disclosure is directed to a food stirring device comprising: a drum that extends in an axial direction, has a hollow shape, and includes: an inlet part through which a food to be fed to an inside of the drum passes; and an outlet part that is provided at a position different from the inlet part and through which the food to be discharged from the inside of the drum passes; a drum drive device that rotates the drum around a rotation axis; a stirrer that is at least partially located inside the drum; and a support member that is attached to the drum and supports the stirrer, wherein there is a gap between an inner wall surface of the drum and the stirrer, and wherein a ratio of a shortest diameter to a longest diameter of a cross sectional surface, in a direction perpendicular to the axial direction, of a part of the stirrer that is located inside the drum is ⅓ or greater and 1 or less.

(Aspect 2)

The cross sectional surface, in a direction perpendicular to the axial direction, of a part of the stirrer located inside the drum may have no recessed part.

(Aspect 3)

The stirrer and the support member may not be in contact with a part of the inner wall surface of the drum from a part of a feeding device that feeds the food to the inside of the drum to the outlet part in a direction along the rotation axis.

(Aspect 4)

The stirrer and the support member may not be in contact with the inner wall surface of the drum.

(Aspect 5)

The stirrer may not be divided in a direction along the rotation axis.

(Aspect 6)

A size of the gap in a direction from one of the inner wall surface of the drum and the stirrer to the other may be larger than a minimum size of each of solid form food ingredients contained in the food to be fed to the inside of the drum.

(Aspect 7)

A size of the gap in a direction from one of the inner wall surface of the drum and the stirrer to the other may be 1 mm or greater and 20 cm or less.

(Aspect 8)

The food stirring device may comprise a heat rising device that raises temperature of the food inside the drum.

(Aspect 9)

A device for stirring a viscous food ingredient may be provided.

(Aspect 10)

Another aspect of the present disclosure is directed to a food stirring method comprising the steps of: feeding a food to an inside of a drum that extends in an axial direction and has a hollow shape, via an inlet part of the drum; rotating the drum; and discharging the food inside the drum from the drum, via an outlet part of the drum that is provided at a position different from the inlet part, wherein a stirrer that is supported by a support member attached to the drum is at least partially located inside the drum, wherein as the drum is rotated, the food inside the drum passes through a gap between an inner wall surface of the drum and the stirrer, and wherein a ratio of a shortest diameter to a longest diameter of a cross sectional surface, in a direction perpendicular to the axial direction, of a part of the stirrer that is located inside the drum is ⅓ or greater and 1 or less.

(Aspect 11)

In the step of rotating the drum, the food inside the drum may be caused to move toward the outlet part of the drum in accordance with rotation of the drum.

(Aspect 12)

Another aspect of the present disclosure is directed to a food manufacturing method comprising the steps of: feeding a food to an inside of a drum that extends in an axial direction and has a hollow shape, via an inlet part of the drum; rotating the drum; and discharging the food inside the drum from the drum, via an outlet part of the drum that is provided at a position different from the inlet part, wherein a stirrer that is supported by a support member attached to the drum is at least partially located inside the drum, wherein as the drum is rotated, the food inside the drum passes through a gap between an inner wall surface of the drum and the stirrer, and wherein a ratio of a shortest diameter to a longest diameter of a cross sectional surface, in a direction perpendicular to the axial direction, of a part of the stirrer that is located inside the drum is ⅓ or greater and 1 or less.

REFERENCE SIGNS LIST

10 Food manufacturing apparatus
11 Feeding device
12 Food stirring device
14 Drum drive device
**14*a*** First drive unit
**14*b*** Second drive unit
15 Stirrer
**15*a*** Rotation progression side part
**15*b*** Rotation back side part
16 Support member
21 Drum
**21*a*** Inner wall surface
**22*a*** End opening
**22*b*** End opening
30 Heat rising device
31 Conveyance device
35 Drive roller
36 Drive shaft
37 Drive bearing
38 Power transmission mechanism
39 Drive source
Ar Rotation axis
C Gap
D Diameter
Dn Shortest diameter
Dx Longest diameter
H Food
S Hollow space

The invention claimed is:

1. A food stirring device comprising:

a drum that extends in an axial direction, has a hollow shape, and includes: an inlet part through which a food to be fed to an inside of the drum passes; and an outlet part that is provided at a position different from the inlet part and through which the food to be discharged from the inside of the drum passes;

a drum drive device that rotates the drum around a rotation axis;

a stirrer that is at least partially located inside the drum; and a support member that is attached to the drum and supports the stirrer, wherein there is a gap between an inner wall surface of the drum and the stirrer, wherein a ratio of a shortest diameter to a longest diameter of a cross sectional surface, in a direction perpendicular to the axial direction, of a part of the stirrer that is located inside the drum is ⅓ or greater and 1 or less, and wherein the stirrer and the support member are not in contact with the inner wall surface of the drum.

2. The food stirring device as defined in claim 1, wherein the cross sectional surface, in a direction perpendicular to the axial direction, of a part of the stirrer located inside the drum has no recessed part.

3. The food stirring device as defined in claim 1, wherein the stirrer and the support member are not in contact with a part of the inner wall surface of the drum from a part of a feeding device that feeds the food to the inside of the drum to the outlet part in a direction along the rotation axis.

4. The food stirring device as defined in claim 1, wherein the stirrer is not divided in a direction along the rotation axis.

5. The food stirring device as defined in claim 1, wherein a size of the gap in a direction from one of the inner wall surface of the drum and the stirrer to the other is larger than a minimum size of each of solid form food ingredients contained in the food to be fed to the inside of the drum.

6. The food stirring device as defined in claim 1, wherein a size of the gap in a direction from one of the inner wall surface of the drum and the stirrer to the other is 1 mm or greater and 20 cm or less.

7. The food stirring device as defined in claim 1, comprising a heat rising device that raises temperature of the food inside the drum.

8. The food stirring device as defined in claim 1 is a device for stirring a viscous food ingredient.

9. A food stirring method comprising the steps of:

feeding a food to an inside of a drum that extends in an axial direction and has a hollow shape, via an inlet part of the drum;

rotating the drum; and discharging the food inside the drum from the drum, via an outlet part of the drum that is provided at a position different from the inlet part, wherein a stirrer is supported by a support member attached to the drum, and wherein the stirrer is at least partially located inside the drum, wherein as the drum is rotated, the food inside the drum passes through a gap between an inner wall surface of the drum and the stirrer, wherein a ratio of a shortest diameter to a longest diameter of a cross sectional surface, in a direction perpendicular to the axial direction, of a part of the stirrer that is located inside the drum is ⅓ or greater and 1 or less, and wherein the stirrer and the support member are not in contact with the inner wall surface of the drum.

10. The food stirring method as defined in claim 9, wherein in the step of rotating the drum, the food inside the drum is caused to move toward the outlet part of the drum in accordance with rotation of the drum.

11. A food manufacturing method comprising the steps of:

feeding a food to an inside of a drum that extends in an axial direction and has a hollow shape, via an inlet part of the drum;

rotating the drum; and discharging the food inside the drum from the drum, via an outlet part of the drum that is provided at a position different from the inlet part, wherein a stirrer is supported by a support member attached to the drum, and wherein the stirrer is at least partially located inside the drum, wherein as the drum is rotated, the food inside the drum passes through a gap between an inner wall surface of the drum and the stirrer, wherein a ratio of a shortest diameter to a longest diameter of a cross sectional surface, in a direction perpendicular to the axial direction, of a part of the stirrer that is located inside the drum is ⅓ or greater and 1 or less, and wherein the stirrer and the support member are not in contact with the inner wall surface of the drum.

* * * * *